United States Patent
Stemmle

(10) Patent No.: US 7,300,044 B2
(45) Date of Patent: Nov. 27, 2007

(54) PERSONALIZED DOCUMENT AND METHOD FOR MAKING SAME

(75) Inventor: Denis J. Stemmle, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 307 days.

(21) Appl. No.: 11/061,250

(22) Filed: Feb. 18, 2005

(65) Prior Publication Data

US 2006/0190125 A1 Aug. 24, 2006

(51) Int. Cl.
*B65H 37/04* (2006.01)

(52) U.S. Cl. ............. 270/52.18; 270/1.01; 270/1.02; 270/1.03; 270/52.03; 270/58.08; 700/223; 700/224; 700/227

(58) Field of Classification Search ........... 270/1.01, 270/1.02, 1.03, 52.03, 52.18, 58.08; 700/223, 700/224, 227

See application file for complete search history.

(56) References Cited

U.S. PATENT DOCUMENTS

| | | | | |
|---|---|---|---|---|
| 3,955,750 A | * | 5/1976 | Huffman | 229/69 |
| 4,149,711 A | * | 4/1979 | Jackson | 270/1.02 |
| 4,497,509 A | * | 2/1985 | Gore | 229/69 |
| 5,238,183 A | * | 8/1993 | Sauerwine | 229/304 |
| 5,366,146 A | * | 11/1994 | Haan et al. | 229/304 |
| 5,717,843 A | * | 2/1998 | Tabata et al. | 358/1.18 |

* cited by examiner

*Primary Examiner*—Gene O. Crawford
*Assistant Examiner*—Leslie A Nicholson, III
(74) *Attorney, Agent, or Firm*—Brian A. Collins; Angelo N. Chaclas

(57) ABSTRACT

A method for producing a document suitable for mailing to a recipient including the steps of determining preferences of the mail recipient and compiling a selection of messages relating to recipient preferences in a format accommodating variable data printing. The compilation of messages is printed on sheets of material which are arranged to form a multi-sheet stack. The stack is then bound along an edge to produce a personalized information package such as a catalog, coupon booklet, brochure or magazine suitable for mailing. The binding step may be performed by deformation binding to eliminate the use of consumable binding materials such as glue, staples, clips, etc.

5 Claims, 4 Drawing Sheets

US 7,300,044 B2

PERSONALIZED DOCUMENT AND METHOD FOR MAKING SAME

TECHNICAL FIELD

This invention relates to a method for generating a document, and more particularly, to a method for obtaining and arranging personalized information into a package suitable for mailing.

BACKGROUND OF THE INVENTION

Conventional store or retail catalogs typically contain advertisements for merchandise from a single merchant or from several retailers/merchants having a common product or product theme. Catalogs distributed for the purpose of mail order are generally distributed to customers having a previous buying history with the merchant and/or sent to mail recipients who financially or demographically are more likely to respond favorably to the merchant's product. With respect to the latter, the cost and time in connection with postage and shipping typically precludes a merchant from contacting/communicating with potential customers from all financial, geographic, racial and/or ethnic backgrounds. Without more data and information about the preferences and interests of mail recipients, a merchant has little choice but to distribute such communications to a large audience in an effort to reach those who may have a genuine interest.

This approach to advertising results in numerous unwanted/unsolicited mailpieces (e.g., catalogs, brochures, and other printed paraphernalia) being discarded without, in many instances, being opened/reviewed. It will be appreciated that this method of communicating depletes natural resources (e.g., wood for paper) and places an increased burden on the environment, e.g., filling landfills and taxing recycling efforts. Exacerbating these drawbacks and disadvantages are catalogs and brochures which advertise the full spectrum of a merchant's product line and, consequently, will almost assuredly, contain information that is not of interest to the mail recipient.

While, in the past, merchants/retailers were limited in their ability to acquire data concerning customer preferences (i.e., limited to historical data of a customer's purchases with a merchant), the Internet or World Wide Web has provided a powerful business tool useful for developing preference data and information. With the Internet's continuously improving capabilities, market research can be performed in a timely manner and with a far greater level of fidelity. As a result, such data can be made available to enterprises for the purpose of "targeting" their customer audience. The value of such data and information is dependent upon a myriad of factors, though, a principal driver is cost avoidance. That is, by avoiding the cost and time associated with mailing catalogs to disinterested recipients, significant savings are achievable.

Directly related to the use of the Internet for obtaining market data and information is the use of electronic mail communications to reach potential customers. The cost of such e-mail advertisements is a fraction of that associated with direct mailing, and, consequently, this medium of advertising has grown significantly. Ironically, this growth appears to be occurring in spite of other market data which supports the contrary. That is, advertising by direct mail produces a more favorable response (i.e., positive response) than e-mail or Internet advertising. Consequently, merchants are faced with the dilemma of choosing the medium, i.e., direct mail vs. e-mail, which will yield the most cost efficient solution. When choosing, the merchant must consider whether the cost saved by e-mail advertising will offset and/or outperform the increased revenues generated by direct mail advertising.

Therefore, a need exists for an economically viable method for direct mail communications and advertising which optimizes customer response.

SUMMARY OF THE INVENTION

A method is provided for producing a document suitable for mailing to a recipient. The method includes the steps of determining preferences of the mail recipient and compiling a selection of messages relating to the recipient preferences in a format accommodating variable data printing. The compilation of messages is printed on sheets of material which are arranged to form a multi-sheet stack. The stack is then bound along an edge to produce a personalized information package such as a catalog, coupon booklet, brochure, or magazine suitable for mailing. The binding step may be performed by deformation binding.

The personalized information package produced by the inventive method provides a cost efficient and effective means for communicating information which is specifically tailored to a mail recipient. Furthermore, the personalized information package eliminates the use of consumable binding materials such as glue, staples, clips, etc.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION

The present invention is described in the context of a personalized information package having a plurality of messages selected according to individual preference data and information. While the personalized information package may describe the products and/or services of a merchant/retailer, the invention is broadly applicable to any communications from a person, entity or an agent thereof. For example, a university, organization or company may wish to interest or recruit an individual by sending him/her a brochure of personalized information which attracts/entices that individual to become student/member/employee. As another example, a magazine publisher may create an individualized publication containing only stories or articles of known interest to the recipient. The information need not be of a product or service but of any information specifically tailored to that individual. Additional examples of catalogs, brochures and magazines are described hereinafter. It should, therefore, be appreciated that the described embodiment is merely illustrative of a useful application of the invention and should be interpreted broadly in accordance with the scope of the appended claims.

Figure 1:
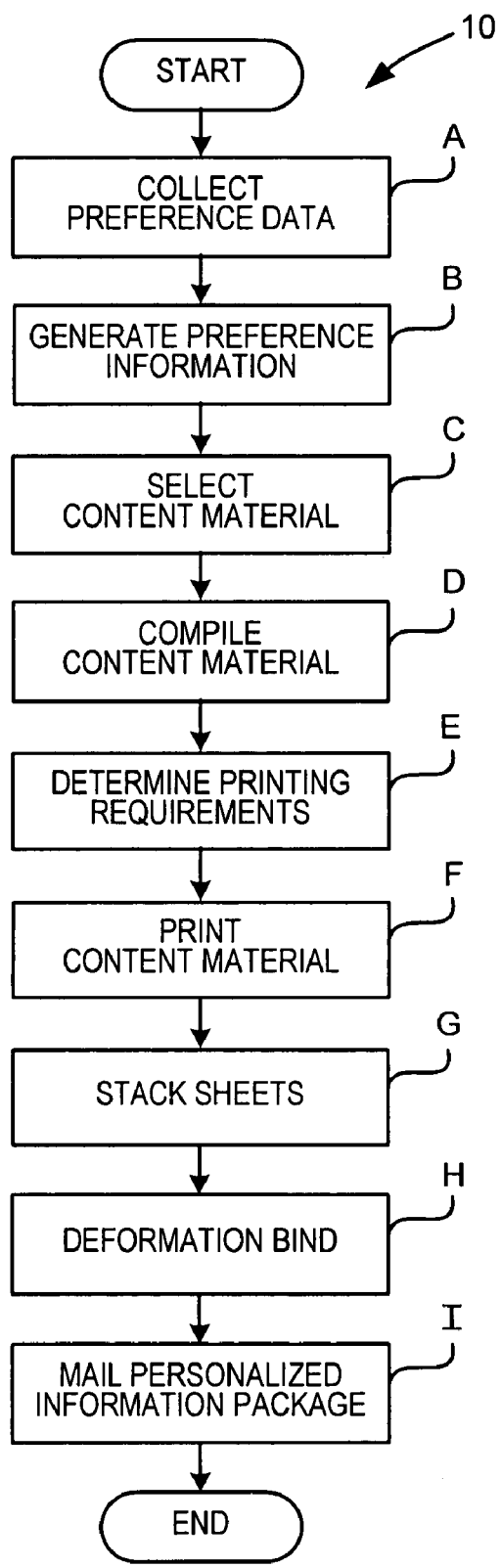
FIG. 1 is a flowchart depicting various steps of a method for producing a personalized information package suitable for mailing.
Figure 2:
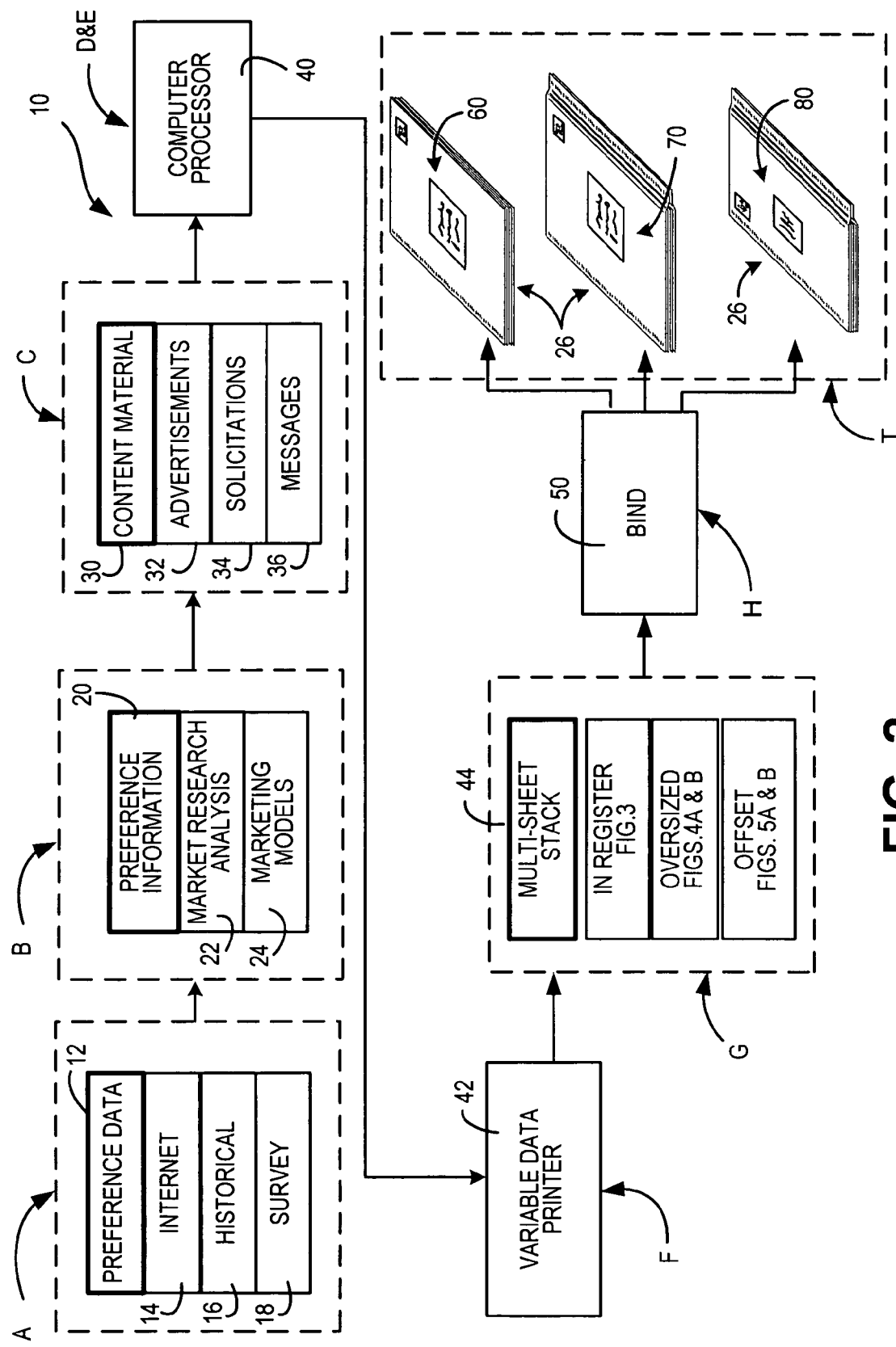
FIG. 2 shows a schematic block diagram of various elements employed in the practice of the inventive method.

Referring now to FIGS. 1 and 2, a flowchart and a schematic block diagram depict the various elements and steps, respectively, employed in the practice of the inventive method 10. An initial step A includes the collection of recipient preference data 12 via one or more known data collection methods. In the context used herein, "preference data" is any data relating to the interests, values, life circumstances, patterns or other activities of an individual and which is specific to that individual. While some individuals may have identical preferences, the data is derived from an individual's actions, activities or communications.

Personalized preference data 12 is available through a myriad of sources. The method for acquiring such data 12 may include those which are very sophisticated/technology-based, or those which are more traditional and/or customer dependent. An example of a technology-based method includes the use of various tracking services and/or software utilities available on and/or for use in combination with the World Wide Web or Internet 14. Such devices/services/software, with the permission of the Internet user (i.e., generally required to avoid personal privacy issues), are capable of recording web-sites or domains accessed by the user as he/she scrolls on the Internet 14.

A more traditional method for obtaining preference data may include the historical records 16 of an individual's buying patterns or data obtained directly from a survey 18 of an individual's preferences. Historical data 16 is typically available directly from a merchant/retailer with whom the individual has a previous buying history. Data 18 from surveys will commonly be obtained from market research companies specializing in the formulation of questions which yield actionable results. Another source of information comes from cards issued by a merchant for the purpose of gathering information on a customer's buying pattern in exchange for discounts.

Raw data standing alone is not actionable; hence, at step B, the preference data 12 is reviewed and analyzed to yield useful preference information 20. Generally, market research analysis 22 and marketing models 24 may be used to test certain assumptions and conclusions. The preference data 12 may be studied to ensure that an identified preference is actually valid in contrast to one which is merely suggested, i.e., based upon one or more isolated events/activities. For example, data that an individual visited a ski resort may suggest that the individual enjoys skiing, however, without additional data, one cannot have a high level of confidence that the conclusion is valid. If, on the other hand, additional data indicating that the individual purchased a pair of skis and lift tickets for seven days, then the conclusion may be reasonable and supportable. Consequently, from the preference information 20, a communication strategy is developed for selecting the contents of the personalized information package 26.

In steps C and D, various communications 30, e.g., advertisements 32, solicitations 34, messages 36, or articles of interest to the recipient, etc., are selected and compiled based upon the preference information 20. For example, in step C, the content material 30 selected for an individual having preferences 20 relating to skiing, automobiles and designer clothing may include: (i) an advertisement for a particular brand of ski boots, (ii) a solicitation for attendance at an upcoming classic automobile show, (iii) a message that a well-known clothier will be opening a new store in a town adjoining the residence of the individual, and perhaps, (iv) a reprinted article from a sports magazine rating the facilities at various skiing venues. As used herein, "content material" is a collection of at least two unique pieces of information selected based upon the individual preferences of the mail recipient.

In step D, the content material 30 is compiled, e.g., downloaded, scanned, or typed etc., by a computer processor 40 in a format suitable for printing on a variable data printer 42. As used herein, a "variable data" printer is a device capable of varying the characters and/or images from one print sequence to another without the requirement to alter or replace elements of the print head. Suitable variable data printers for practicing the method 10 include laser, inkjet, or dot matrix printers, though any printer which is responsive to electronic commands, i.e., for varying the content material 30, will generally satisfy the print requirements. The variable data printers may print color and/or monochromatic information.

In step E, other print requirements which may be considered include the area available for printing as a consequence of subsequent method steps. More specifically, the personalized information package 26 may be arranged and bound in a manner which necessitates certain page set-up requirements. For example, a method step which requires one or more trimming operations to achieve a particular configuration may require larger margins. Alternatively, a particular configuration may necessitate a layout which favors landscape rather than portrait printing. It will be appreciated that a variety of other considerations may impact the print layout, and, suffice it to say subsequent steps may impact the optimum area for printing. These considerations should be given adequate thought in advance of fabrication steps which bind the content material.

In steps F and G, the content material 30 is printed and stacked in preparation for binding. More specifically, the variable data printer 42 prints the content material on any desired media, e.g., letter size paper, and arranged in a multi-sheet stack 44. The multi-sheet stack 44 may be arranged in a variety of configurations depending upon whether the variable data printer 42 is limited to printing on standard/stock size sheets (e.g., letter, legal, A4, etc.) or can be adapted to print on customized sheets, e.g., sheets cut to any desired size or shape. For the purposes of setting forth examples which put the breadth and scope of the invention in perspective, several embodiments of the multi-sheet stack 44 are described and illustrated. These include arrangements wherein one or more of the sheets of the stack 44 are (i) in register, (ii) oversized or (iii) offset. Before discussing each in greater detail, the remaining steps of the inventive method 10 are described.

Additionally, the content material 30 may be prioritized based upon the preference information. That is, depending upon the level of interest of a recipient, the content material 30 may be arranged such that preferences of greater interest are presented before those of lesser interest. For example, a personalized information package 26 for an individual having a principle interest in boating and only a passing interest in cooking, may be arranged such that a boating advertisement appears on the cover or face sheet and a cooking recipe on one of the last pieces of content material 30 in the multi-sheet stack 44. Further, the selected content material may be personalized for the mail recipient. By "personalized" is meant that the content material may be modified to include the name or address of the mail recipient in the body of the content material. Rather than an advertisement referring to a generic individual in the body of the content text, the mail recipient's name may be inserted to provide a more personal touch.

In step H, the multi-sheet stack 44 is bound to produce the personalized information package 26 suitable for mailing. In the described embodiments, the multi-sheet stack is deformation bound by sheet deformation apparatus 50 to eliminate the use of consumables such as glue, staples, clips, etc. In the context used herein, "deformation binding" means any binding method wherein the sheets of a multi-sheet stack are plastically deformed to cause the sheet materials to mechanically interlock. This includes, inter alia, knurling, embossing, interleaving, or folding of the sheet material to bind without the use of consumables.

When knurling or embossing, it is generally believed that following plastic deformation of the sheets, the elastic properties thereof develop sufficient mechanical forces at or along the deformed interface to bind the sheets. Alternatively, or additionally, the individual fibers of paper stock, upon the application of sufficient pressure/force, may interleave or "hook" in a manner similar to hook and loop fasteners. When using this approach, the thickness or number of sheets of the stack 44 may be limited by the pressure or force applied by the knurling or embossing apparatus 50.

When interleaving or folding, the material may be folded and/or cut and folded to form individual interlocking tabs or a single elongate fold to mechanically interlock the sheet material. The embodiments discussed in subsequent paragraph employ a knurling apparatus to deformation bind at least one edge of the multi-sheet stack 44.

Once bound, the personalized information package 26 is prepared for mailing in a conventional manner. FIG. 2 shows several configurations 60, 70, and 80 produced by the binding apparatus 50 and prepared for mailing. Finally, in step I, the personalized information package 26 is mailed to the recipient for which the package was specifically intended.

Figure 3:
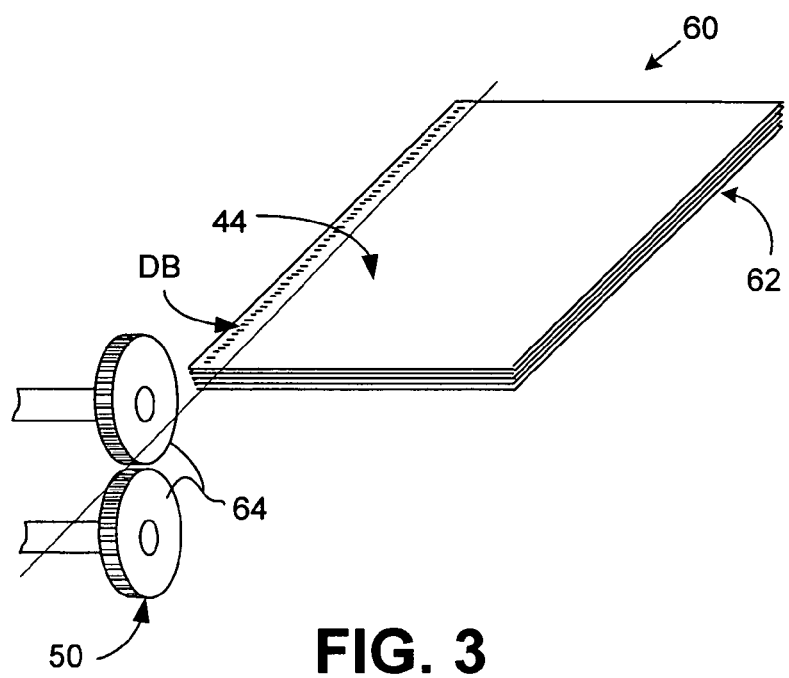
FIG. 3 depicts an isolated perspective view of the personalized information package according to one embodiment of the invention wherein a multi-sheet stack of sheet material is disposed in register and deformation bound along an edge.

In FIG. 3, the individual sheets 62 defining the multi-sheet stack 44 are placed in register i.e., top, bottom and side edges being aligned, in preparation for deformation binding. As mentioned above, the binding apparatus 50 knurls the sheets 62 by passing the stack 44 between a pair of closely spaced knurling wheels 64. The thickness of the stack 44, or the combined thickness of the sheets 62, is greater than the spacing between the wheels 64.

The deformation wheels 64 are rotated in opposite directions such that when the stack 44 is placed between the wheels 64, the mechanical deformation forces applied by the teeth on the wheels 64 draws the stack 44 through the wheels 64. In this embodiment of the invention, the stack 44 is deformation bound along a single edge, though as will be seen in other embodiments, the stack 44 may be bound along two or more edges. As will be discussed in greater detail below, binding along multiple edges may be desirable to facilitate processing of the mailpiece by postal sorting equipment.

Deformation apparatus of the type described are known in the art and commonly used to create paper enclosures (e.g., soda straws and around tea bags). One skilled in this art will have the necessary expertise to design and fabricate such knurling apparatus, hence, no further detail will be provided or is necessary.

Figure 4A:
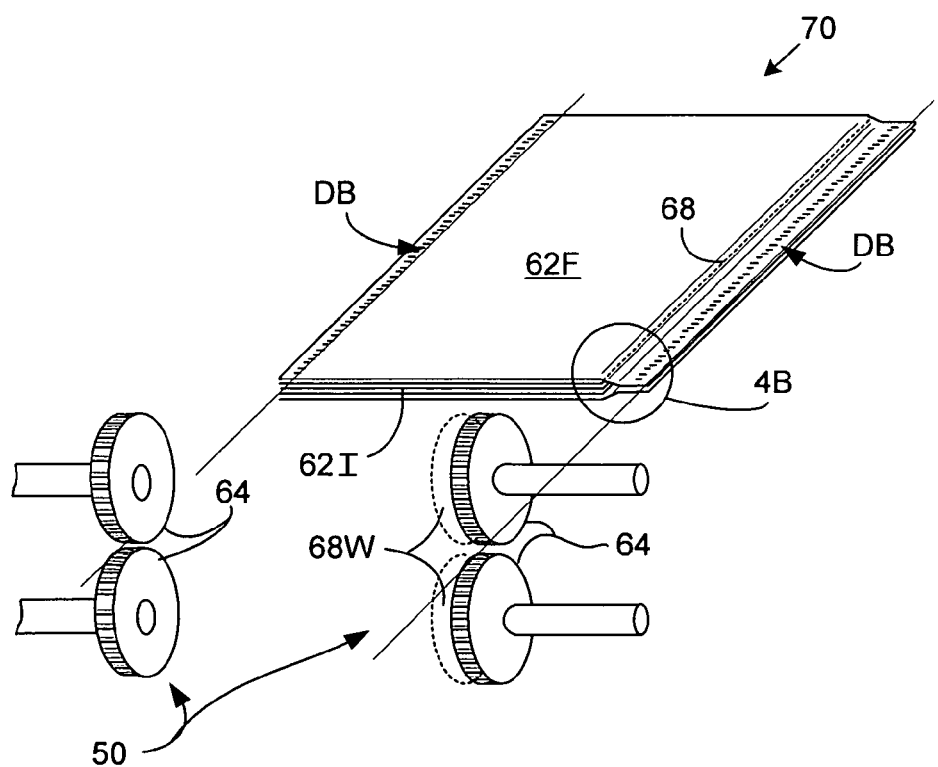
FIG. 4A depicts an isolated perspective view of the personalized information package according to another embodiment of the invention wherein face sheets of the multi-sheet stack are oversized, extend beyond the edges of intermediate sheets, and are deformation-bound along the contiguous face sheet edges.
Figure 4B:
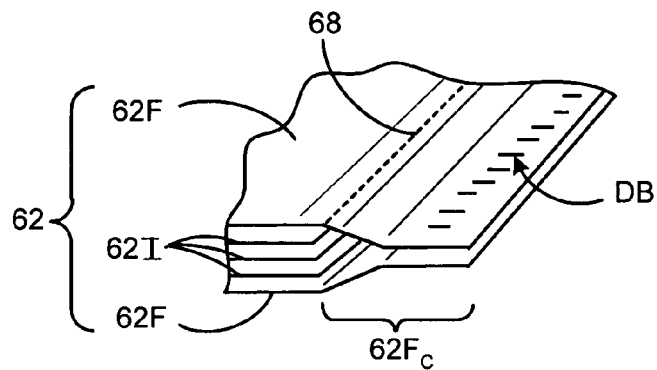
FIG. 4B depicts an enlarged view of a corner of the personalized information package shown in FIGS. 4A and 5A.

In FIGS. 4A and 4B, the face sheets 62F are oversized relative to the intermediate sheets 62I such that at least one edge 62F$_C$ of each face sheet 62F extends beyond an edge of the intermediate sheets 62I. As used herein, a "face" sheet means an exterior sheet abutting another sheet on one side only. Furthermore, the extended edges 62F$_C$ are contiguous and deformation bound so as to enclose and capture the intermediate sheets 62I. As such, the mailed personalized information package 70 has all sheets bound along one edge, and the face sheets bound along a second edge to secure the package.

In this embodiment, it may also be desirable to form aligned perforations 68 inboard of the deformation binding DB, such that the mail recipient may tear away the extended edges 62F$_C$ to create a clean-edged appearance. This may be achieved by the addition of perforation wheels 68W which are co-axial with and driven by the knurling wheels 64. Furthermore, this operation may be performed at the same time that the extended edges 62F$_C$ are deformation bound. Alternatively, the face sheets may be perforated in advance of the binding step (e.g., supplied to the printer perforated).

Figure 5A:
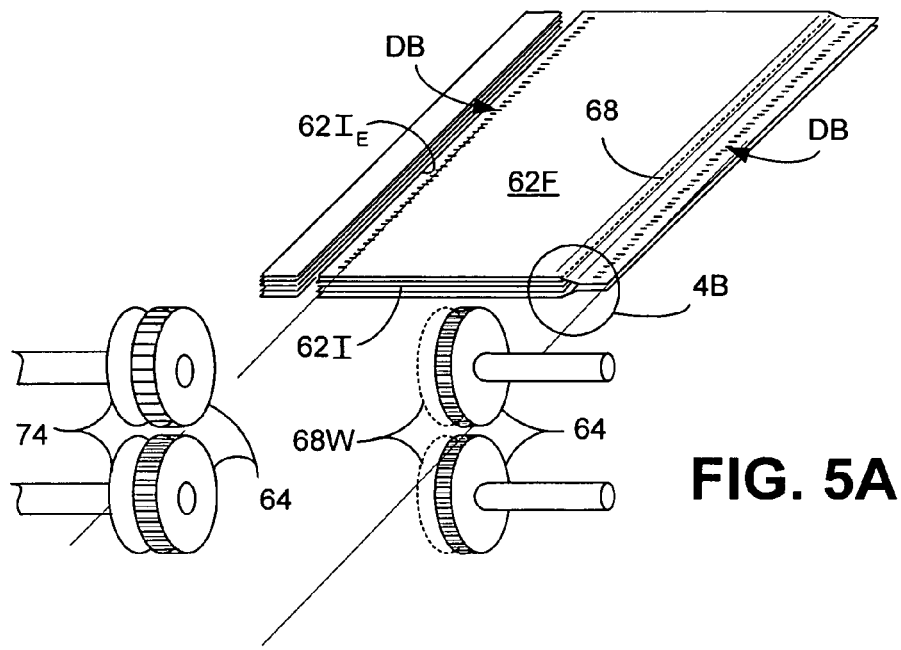
FIG. 5A depicts an isolated perspective view of the personalized information package according to another embodiment of the invention wherein face sheets of the multi-sheet stack are offset such that the edges thereof extend beyond the edges of intermediate sheets, are trimmed outboard of the face sheets, and are deformation-bound along the contiguous face sheet edges.
Figure 5B:
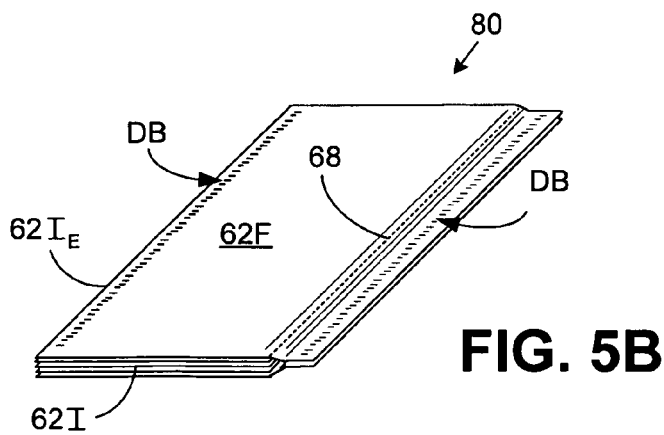
FIG. 5B depicts an isolated perspective view of the trimmed personalized information package of FIG. 5A.

In FIGS. 5A and 5B, the face sheets 62F are offset relative to the intermediate sheets 62I such that one edge 62F$_C$ of each face sheet 62F extends beyond the intermediate sheets 62I. As such, the face sheets 62F do not fully cover the intermediate sheets 62I, and the location of the deformation binding DB is shifted inboard of the edge 62I$_E$ of the intermediate and face sheets 62I, 62F such that all sheets 62 are bound together, although not immediately adjacent the outermost edge 62I$_E$ of the intermediate sheets 62I. Consequently, a portion of intermediate sheets 62I, which lies outboard of the face sheets 62F and binding DB, is trimmed away during binding operations. In this embodiment, cutting wheels 74 are disposed outboard of the knurling wheels 64 to enable simultaneous binding and trimming.

Similar to the previous embodiment and referring to FIG. 4B, the extended edges 62F$_C$ are contiguous and deformation bound so as to enclose and contain the unbound edges of the intermediate sheets 62I. As such, the mailed personalized information package 80 (FIG. 5B) is bound along two edges. That is, all sheets 62I, 62F are bound together along one edge 62$_E$ while only the face sheets 62F are bound along the second edge $62F_E$. Similarly, it may be desirable to form aligned perforations 68 inboard of the deformation binding DB, such that the mail recipient may tear away the extended edges $62F_C$.

The personalized information package 30 may take a variety of forms including that of a catalog, brochure or magazine. A catalog produced in accordance with the present invention may include a collection of various products or services of specific interest to the mail recipient. If the mail recipient is a fan of tennis, the catalog may contain advertisements for tennis equipment from a variety of different manufacturers and information concerning the dates and participants of the US Open Tennis Tournament. A collection of bound coupons, i.e., coupon booklet for a variety of products, services or other offerings may represent yet another appropriate example of a personalized catalog produced by the inventive method.

A brochure in accordance with the teachings of the method may take the form of a personalized solicitation to a gaming establishment or casino that a recipient has, in the past, been an active player. If the recipient principally played the game of poker (known from guest cards issued by casinos to track the activities of players at the casino), the brochure may display pictures of the poker room along with information about upcoming poker tournaments at the casino, and coupons for free or reduced price amenities offered for the purpose of attracting the player back into the casino.

A magazine having articles specifically chosen based upon preference information is yet another viable example of the inventive method. For example, an individual with known interests in politics and gourmet cooking may enjoy a publication containing articles from the National Review, letters from the Presidential Archives, and cooking recipes from the Culinary Institute of NY.

In summary, collecting and using such data and information to create individualized catalogs, brochures, magazines, etc. tailored to the known preferences, values, life circumstances, hobbies, and needs of individual recipients are beneficial to both the sender and recipient. The sender avoids the cost and time associated with mailing to disinterested recipients. The recipients are more likely to welcome a personalized information package tailored to their preferences, values, life circumstances, hobbies and needs. Fewer environmental resources are wasted. Further, the deformation binding operation can be performed at a single workstation without the requirement for consumable materials such as glue, staples or clips to bind the information package.

It is to be understood that the present invention is not to be considered as limited to the specific embodiments described above and shown in the accompanying drawings, which merely illustrate the best mode presently contemplated for carrying out the invention, and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method for producing a mailpiece, comprising the steps of:
    preparing content material in a format suitable for use in the fabrication of the mailpiece;
    printing the content material on sheets using a variable data printer, the sheets including face sheets and at least one intermediate sheet;
    arranging the intermediate and face sheets to form a multi-sheet stack, the intermediate sheet being disposed between the face sheets and the face sheets being arranged such that at least one edge thereof extends beyond an edge of the intermediate sheet;
    deformation binding the multi-sheet stack along parallel bind lines to at least partially enclose the multi-sheet stack;
    wherein the step of arranging the sheets of the multi-sheet stack further comprises the step of:
    placing the face sheets of the multi-sheet stack such that the face sheets are offset relative to at least one intermediate sheet disposed therebetween, the face sheets being arranged such a first edge of each is disposed inboard of a first edge of the intermediate sheet and a second edge extends beyond a second edge of the intermediate sheet, the first and second edges being parallel to each other, the first edge of each face sheet producing an uncovered portion, and the intermediate sheet and the extended second edges of the face sheets being contiguous, and
    wherein the step of deformation binding the parallel bind lines includes the steps of:
    deformation binding the multi-sheet stack along a first bind line disposed inboard of the first edges of the face sheets, and
    deformation binding the multi-sheet stack along a second bind line disposed inboard of the extended second edges of the face sheets.

2. The method according to claim 1 further comprising the step of
    trimming the uncovered portion the intermediate sheet at a location outboard of the first bind line.

3. The method according to claim 1 wherein the personalized information package is one of a catalog, coupon booklet, brochure, and magazine.

4. The method according to claim 1 further comprises the steps of:
    perforating the multi-sheet stack inboard of the deformation binding along the face sheet edge.

5. The method according to claim 1 further comprising the step of prioritizing the selected content material based upon the preference information.

* * * * *